United States Patent [19]
Ito

[11] 3,962,859
[45] June 15, 1976

[54] CELL REPLACEMENT INDICATION DEVICE

[75] Inventor: Kazuo Ito, Tokyo, Japan

[73] Assignee: Kabushiki Kaisha Daini Seikosha, Japan

[22] Filed: Aug. 21, 1974

[21] Appl. No.: 499,206

Related U.S. Application Data

[63] Continuation of Ser. No. 281,187, Aug. 16, 1972, abandoned.

[30] Foreign Application Priority Data

Aug. 20, 1971 Japan.......................... 46-74319[U]

[52] U.S. Cl................................ 58/23 BA; 58/50 R; 58/152 H
[51] Int. Cl.² ..................... G04C 3/00; G04B 19/30
[58] Field of Search............. 58/23 R, 23 BA, 50 R, 58/152 H; 340/248 B, 249

[56] References Cited
UNITED STATES PATENTS

| | | | |
|---|---|---|---|
| 2,542,021 | 2/1951 | Fox | 58/50 R |
| 3,212,252 | 10/1965 | Nakai | 58/23 R |
| 3,505,804 | 4/1970 | Hofstein | 58/50 R X |
| 3,672,154 | 6/1972 | Habner | 58/23 BA |
| 3,672,155 | 6/1972 | Bergey et al. | 58/50 R |
| 3,678,499 | 7/1972 | McCarty | 340/336 |
| 3,691,755 | 9/1972 | Girard | 58/50 R |

*Primary Examiner*—Edith Simmons Jackmon
*Attorney, Agent, or Firm*—Robert E. Burns; Emmanuel J. Lobato; Bruce L. Adams

[57] ABSTRACT

An indicating device for use in an electronic watch circuit indicating visually on the dial of the watch that the power cell in the circuit is operating properly and the circuit itself is operating properly. Cessation of the visual signal indicates that the cell should be replaced. The device uses a light-emitting element energized intermittently by pulses generated in the watch's electronic driving circuit. The threshold voltage of the light-emitting element is higher than the voltage necessary to adequately drive the driving circuit for keeping time accurately. A drop of the voltage below this threshold results in absence of light emissions and this indicates the cell is near exhaustion and must be replaced.

6 Claims, 7 Drawing Figures

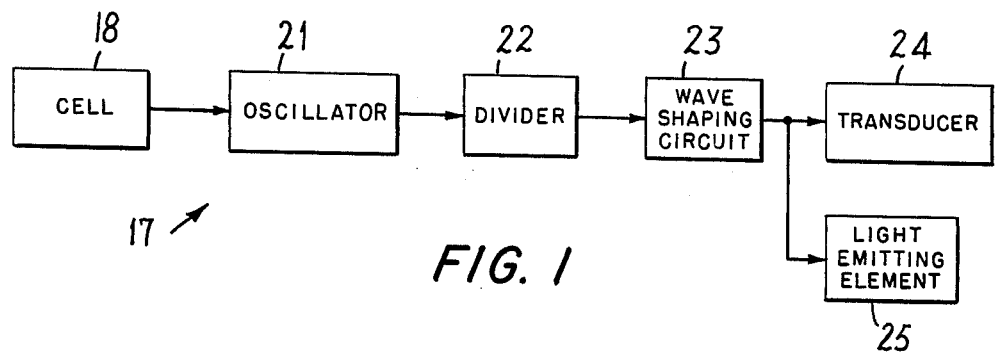
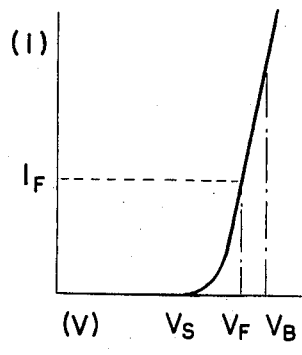
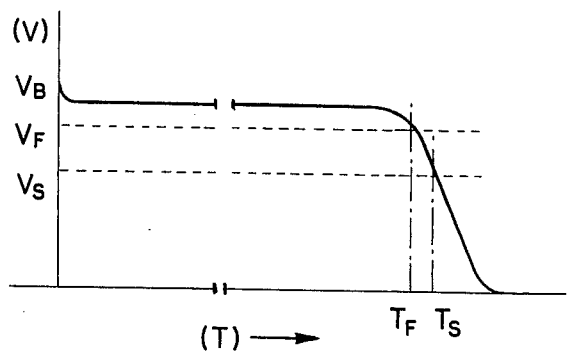

CELL REPLACEMENT INDICATION DEVICE

This is a continuation, of application Ser. No. 281,187, filed Aug. 16, 1972 which is now abandoned.

BACKGROUND OF THE INVENTION

This invention relates generally to electronic watches and more particularly to devices for indicating the life of the electric cell or battery powering such as watch and indicating the need for replacement of the cell.

Electric cells or batteries for electronic watches have an operating life of about one year. Once a cell is placed in use in a watch there is no convenient way of knowing when the cell requires replacement. The user must generally rely on misoperation of the watch to indicate to him that the cell is near exhaustion and must be replaced in order for the watch to function properly. Thus as the output of the cell decreases below a certain level, an electronic watch will not keep time correctly and will eventually stop. Because the user of such a watch generally wants his watch to operate properly and keep correct time, there is a tendency on his part to approximate the life of the cell and this can lead to a premature and unnecessary replacement of the cell.

SUMMARY OF THE INVENTION

It is an object of the present invention to provide a device or apparatus accurately indicating the operating life of an electric cell or battery in an electronic watch and the need for replacement of the cell with another cell.

Another object of the invention is to provide a device powered by a cell for visually indicating proper operation of the cell and the need for replacement of the cell while drawing a minimum of power from the cell and optimizng the life of the indicating element itself.

According to the invention a light-emitting element is connected to the electronic circuit of a watch that drives the hands thereof for indicating to a viewer with its light emissions that the power cell of the circuit has an output above a given level for adequately energizing the circuit and accurately driving the watch bands. The light-emitting element indicates, by the termination of light emissions that the output of the cell is below the given level and requires replacement because the cell is close to exhaustion.

The electronic circuit is of the type having a frequency divider driving high frequency pulses to a low frequency and the low frequency pulses are applied to the light-emitting element. The light-emitting element, for example a light-emitting diode, has a potential threshold selected relative to the output of the cell so that when the output exceeds this threshold the diode emits light and once the value of the output is below this level, the light emissions terminate. The threshold level is selected sufficiently above a value of the cell output so that the circuit elements are still properly energized and the watch keeps time accurately for a short time after the cell output falls below said threshold level. The output of the cell is at this time reduced and the cell still has a predetermined time for operating the watch properly allowing adequate time for the user of the watch to note the absence of light emissions and to replace the cell.

BRIEF DESCRIPTION OF THE DRAWINGS

FIG. 1 is a block diagram of an electronic circuit for a watch provided with an indicating device according to the invention;

FIG. 2a, FIG. 2b and 2c are diagrams of waveforms appearing at various points in the circuit in FIG. 1;

FIG. 3 is a plan view of a watch provided with the circuit and indicating device such as illustrated in FIG. 1;

FIG. 4 is a diagram of a threshold potential characteristic curve of a light-emitting element in the indicating device in FIG. 1; and FIG. 5 is a diagram of a potential or voltage output curve of a cell driving the electronic circuit in FIG. 1.

DESCRIPTION OF A PREFERRED EMBODIMENT

As illustrated in the drawings, an electronic watch 10 has time-indicating means for indicating the time comprising a dial 11 on which a second hand 12, a minute hand 13 and an hour hand 14 indicate the time in seconds, minutes and hours in conjunction with time indicia on the face of the dial 11 in a conventional manner. The dial has a "window" 15 for displaying a calendar indicating the day of the week and the date in known manner. A second window 16 is provided in the dial 11 for viewing therethrough intermittent light emissions of an indicating device hereinafter described.

The hands of the electronic watch 10 are driven by an electronic circuit 17 illustrated in FIG. 1. The electronic circuit has a cell or battery 18 driving an oscillator 21, for example a quartz crystal type oscillator, that develops high frequency oscillations illustrated in FIG. 2a divided by a frequency divider 22 which develops a low-frequency output shown in FIG. 2b. The low-frequency output is applied to a wave-shaping circuit 23 to produce periodic low frequency clock pulses P illustrated in FIG. 2c. The clock pules P are applied to an electromagnetic transducer 24 that converts the pulses to mechanical driving of the watch hands. The electromagnetic transducer is known in the art and need not be described. The transducer output drives the second hand 12 incrementally so that the other hands are driven accurately in proper timed relationship in known manner.

Provision is made in the watch embodying the invention for indicating visually the condition of the cell 18 and more particularly, that the cell output voltage is sufficient to energize the circuit elements so that the transducer 24 operates properly and the watch hands are accurately driven. When voltage output of the cell drops below a desired level, the visual signal changes thereby indicating that the cell must be replaced since only a relatively short operative life remains in the cell for accurately driving the watch. The visual indication is provided by a light-emitting diode 25 connected to receive the clock pulses P likewise applied to the transducer 24.

The light-emitting diode 25 has a voltage threshold characteristic illustrated by a curve in FIG. 4 in which current I is plotted on the ordinate axis and voltage V on the abscissa axis as illustrated. When a voltage is applied to the light-emitting diode 25 above a voltage $V_s$, current flows through it as shown by the curve. The diode emits light at a given voltage $V_F$ and the light emissions comprise a first visual signal which indicates to the watch user that the cell 18 does not yet need replacement. The diode is operated generally in a voltage ranging from $V_S$ to $V_B$. The latter point $V_B$ is the maximum voltage output of the electric cell 18.

The electric cell generally used in electronic circuits for these watches is generally a mercury battery or metal oxide battery or cell. The discharge characteristic of such a cell is shown in FIG. 5. As can be seen the discharge curve is flat for a fairly long period from $T_O$ to $T_F$. During this period the voltage output $V_B$ remains generally constant but falls off rapidly between $T_F$ and $T_S$ when the cell nears exhaustion.

It will be remembered that the light-emitting element 25 emits light when the voltage $V_F$ is exceeded. Thus when the cell voltage output drops below $V_F$, the diode will not function and its light emissions will terminate and the absence of light emissions comprises a second visual signal which indicates to the watch user that the cell 18 is near exhaustion and needs replacement. The electronic circuit will function and maintain accurate time indications even if the cell voltage $V_B$ decreases to the extent of 50 to 70%; i.e., 0.5 $V_B$ to 0.7 $V_B$. Accordingly, the watch will operate properly until it obtains a voltage level $V_S$. This latter voltage level is below the level at which the light-emitting element 25 emits light. The invention thus allows a period from $T_F$ to $T_S$ for the cell to be replaced before the watch fails to keep time accurately. When the user sees that the terminaton of intermittent and periodic light pulses has taken place, he has a limited period, $T_F$ to $T_S$, to replace the cell 18. The stopping of the watch can then be avoided.

The device according to the invention provides several advantages. It is apparent that the user of low-frequency, short-duration, clock pulses P greatly reduces power consumption in driving the indicating device so that the operating life of the cell is maximized. It is also possible to accurately determine when the cell is to be replaced without premature replacement thereof and befoe the watch stops or keeps time inaccurately. Furthermore, even if a watch is constructed without luminous hands, the user knows, even in the dark, that the watch is operating properly because of the intermittent light emissions of the light-emitting element.

What I claim and desire to secure by Letters Patent is:

1. In a watch having an electronic circuit powered during use by an electric cell and means in said circuit for developing low-frequency pulses, and time-indicating means responsive to said low-frequency pulses for indicating the time: a device separate from said time-indicating means for displaying visually that the operating life of said cell is near exhaustion comprising a light-emitting element having a threshold voltage selected relative to the output voltage of said cell to indicate by light emissions that said output voltage exceeds a certain value and upon termination of light emissions in dependence upon said output voltage being below said certain value indicating that the cell needs replacement, said output voltage value being selected above a potential level for adequately energizing said electronic circuit and sufficiently close to the exhaustion of the cell to allow normal operation for a short remaining limited time before the output is insufficient to adequately energize said circuit, and means connecting said light-emitting element to said circuit for applying said low-frequency pulses thereto for causing said light-emitting element to emit light intermittently as long as the output voltage of said cell exceeds said certain value and thereafter automatically terminating the light emissions from said light-emitting element due to the dropping of the output voltage of said cell below said threshold voltage to thereby visually indicate by the absence of light emissions that the output of said cell is near exhaustion.

2. In a watch according to claim 1, in which said light-emitting element comprises a light-emitting diode.

3. In a watch according to claim 1, in which said watch comprises a dial, said dial having a face comprising an aperture through which said light emissions are visible.

4. In a watch of the type having an electronic circuit powered during use by a replaceable electric cell: means in said electronic circuit for developing low-frequency pulses; time-indicating means connected to receive the low-frequency pulses and responsive thereto for indicating the time; and means separate from said time-indicating means and responsive to the output voltage of the electric cell
   for providing a first visual signal whenever the output voltage is above a given level, said given level being a predetermined voltage above that needed to adequately energize said electronic circuit, thereby indicating that the electric cell does not yet need replacement,
   and for providing a second visual signal when the output voltage falls below said given level thereby indicating that the electric cell is near exhaustion and needs replacement
whereby a short time period remains after the appearance of the second visual signal during which the output voltage of the electric cell will be sufficient to adequately energize said electronic circuit to maintain said time-indicating means operative thereby enabling the user of the watch to effect replacement of the electric cell before said time-indicating means becomes inoperative due to exhaustion of the electric cell.

5. A watch according to claim 4; wherein said means for providing first and second visual signals comprises a light-emitting element having a threshold voltage corresponding to said given level so that the same emits light whenever the electric cell output voltage is above said given level thereby providing said first visual signal and ceases to emit light when the electric cell output voltage falls below said given level thereby providing said second visual signal.

6. A watch according to claim 5; wherein said means for providing first and second visual signals includes means for applying the low-frequency pulses to said light-emitting element to cause the same to emit light in an intermittent, periodic manner whenever the electric cell output voltage is above said given level thereby providing said first visual signal.

* * * * *